(12) United States Patent
Hockings et al.

(10) Patent No.: US 8,701,163 B2
(45) Date of Patent: Apr. 15, 2014

(54) METHOD AND SYSTEM FOR AUTOMATIC GENERATION OF CACHE DIRECTIVES FOR SECURITY POLICY

(75) Inventors: Christopher John Hockings, Burleigh Waters (AU); Simon Gilbert Canning, Upper Coomera (AU); Scott Anthony Exton, Queensland (AU); Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 13/152,943

(22) Filed: Jun. 3, 2011

(65) Prior Publication Data

US 2012/0311674 A1 Dec. 6, 2012

(51) Int. Cl.
*G06F 21/00* (2013.01)

(52) U.S. Cl.
USPC .......................................................... 726/4

(58) Field of Classification Search
USPC .......................................................... 726/4
See application file for complete search history.

(56) References Cited

U.S. PATENT DOCUMENTS

| | | | |
|---|---|---|---|
| 6,988,280 B2 | 1/2006 | Burnett | |
| 7,046,680 B1 * | 5/2006 | McDysan et al. | 370/396 |
| 7,096,367 B2 | 8/2006 | Garg et al. | |
| 7,580,919 B1 * | 8/2009 | Hannel et al. | 1/1 |
| 7,676,559 B2 * | 3/2010 | Cuervo | 709/223 |
| 8,266,088 B2 * | 9/2012 | Clemm et al. | 706/47 |
| 2005/0021818 A1 * | 1/2005 | Singhal et al. | 709/232 |
| 2005/0021978 A1 * | 1/2005 | Bhat et al. | 713/182 |
| 2009/0157686 A1 | 6/2009 | Idicula et al. | |

OTHER PUBLICATIONS

"Hash table," 2004.*

* cited by examiner

*Primary Examiner* — Andrew Georgandellis
(74) *Attorney, Agent, or Firm* — Jeffrey S. LaBaw; David H. Judson

(57) ABSTRACT

An authorization method is implemented in an authorization engine external to an authorization server. The authorization server includes a cache. The external authorization engine comprises an authorization decision engine, and a policy analytics engine. The method begins when the authorization decision engine receives a request for an authorization decision. The request is generated (at the authorization server) following receipt of a client request for which an authorization decision is not then available at the server. The authorization decision engine determines an authorization policy to apply to the client request, applies the policy, and generates an authorization decision. The authorization decision is then provided to the policy analytics engine, which stores previously-generated potential cache directives that may be applied to the authorization decision. Preferably, the cache directives are generated in an off-line manner (e.g., during initialization) by examining each security policy and extracting one or more cache dimensions associated with each such policy. The policy analytics engine determines an applicable cache directive, and the decision is augmented to include that cache directive. The decision (including the cache directive) is then returned to the authorization server, where the decision is applied to process the client request. The cache directive is then cached for re-use at the authorization server.

22 Claims, 9 Drawing Sheets

```xml
<?xml version="1.0" encoding="UTF-8"?>
<PolicySet xmlns="urn:oasis:names:tc:xacml:2.0:policy:schema:os"
PolicyCombiningAlgId="urn:oasis:names:tc:xacml:1.0:policy-combining-algorithm:deny-overrides"
PolicySetId="http://sps2007" Version="20090201.164359375">
 <PolicySetDefaults>
  <XPathVersion>http://www.w3.org/TR/1999/Rec-xpath-19991116</XPathVersion>
 </PolicySetDefaults>
 <Target/>
 <PolicySet
PolicyCombiningAlgId="urn:oasis:names:tc:xacml:1.0:policy-combining-algorithm:deny-overrides"
PolicySetId="RPS:f5f94957-4447-4f9d-bd83-c5e38c6958b5:policy:ae239ec9-5753-4129-a3d8-ba7fbf7abd
91:role:124a8000-ed47-4d34-956c-80c2c807f875" Version="1.0">
   <Target>
    <Subjects>
     <Subject>
      <SubjectMatch MatchId="urn:oasis:names:tc:xacml:1.0:function:string-regexp-match" >
       <xacml:AttributeValue xmlns:xacml="urn:oasis:names:tc:xacml:2.0:policy:schema:os" Data Type="
http://www.w3.org/2001/XMLSchema#string">.*</xacml:AttributeValue>
       <SubjectAttributeDesignator AttributeId="urn:oasis:names:tc:xacml:1.0:subject:subject-id"
Data Type="http://www.w3.org/2001/XMLSchema#string"
SubjectCategory="urn:oasis:names:tc:xacml:1.0:subject-category:access-subject" />
      </SubjectMatch>
     </Subject>
    </Subjects>
   </Target>
   <Policy PolicyId="PPS:http://sps2007:ae239ec9-5753-4129-a3d8-ba7fbf7abd91:pps"
RuleCombiningAlgId="urn:oasis:names:tc:xacml:1.0:rule-combining-algorithm:first-applicable"
Version="1.0">
    <Target/>
    <Rule Effect="Permit"
RuleId=" null:f5f94957-4447-4f9d-bd83-c5e38c6958b5:ae239ec9-5753-4129-a3d8-ba7fbf7abd91:null:null-1
">
     <Target>
      <Actions>
       <Action>
        <ActionMatch MatchId="urn:oasis:names:tc:xacml:1.0:function:string-equal">
         <xacml:AttributeValue xmlns:xacml="urn:oasis:names:tc:xacml:2.0:policy:schema:os" Data Type="
http://www.w3.org/2001/XMLSchema#string">READ</xacml:AttributeValue>
         <ActionAttributeDesignator AttributeId="http://tspm.ibm.com/sharepoint/action" Data Type="
http://www.w3.org/2001/XMLSchema#string"/>
        </ActionMatch>
       </Action>
      </Actions>
     </Target>
    </Rule>
   </Policy>
 </PolicySet>
</PolicySet>
```

*FIG. 9*

```
<AuthorizationDecision>
    <Decision>          ←―1002
        ALLOW
    </Decision>
    <CacheDirective>
        <When>
            <Action>READ</Action>
        <When>          ←―1004
            <CacheDecision>
                <cache-for-all-users/>
            </CacheDecision>
    </CacheDirective>
<AuthorizationDecision>
```

```
<AuthorizationDecision>
    <Decision>          ←―1202
        ALLOW
    </Decision>
    <CacheDirective>
        <When>
            <Subject>admin</Subject>
            <Action>WRITE</Action>
        </When>         ←―1204
            <CacheDecision>
                <cache-for-user-only/>
            </CacheDecision>
    </CacheDirective>
<AuthorizationDecision>
```

```xml
<?xml version="1.0" encoding="UTF-8"?>
<PolicySet xmlns="urn:oasis:names:tc:xacml:2.0:policy:schema:os"
PolicyCombiningAlgId="urn:oasis:names:tc:xacml:1.0:policy-combining-algorithm:deny-overrides"
PolicySetId="http://sps2007" Version="20090201.164359375">
 <PolicySetDefaults>
  <XPathVersion>http://www.w3.org/TR/1999/Rec-xpath-19991116</XPathVersion>
 </PolicySetDefaults>
 <Target/>
 <PolicySet
PolicyCombiningAlgId="urn:oasis:names:tc:xacml:1.0:policy-combining-algorithm:deny-overrides"
PolicySetId="RPS;f5f94957-4447-4f9d-bd83-c5e38c6958b5:policy:ae239ec9-5753-4129-a3d8-ba7fbf7abd91:role:124a8000-ed47-4d34-956c-80c2c807f875" Version="1.0">
   <Target>
    <Subjects>
     <Subject>
      <SubjectMatch MatchId="urn:oasis:names:tc:xacml:1.0:function:string-regexp-match" >
       <xacml:AttributeValue xmlns:xacml="urn:oasis:names:tc:xacml:2.0:policy:schema:os" Data Type="http://www.w3.org/2001/XMLSchema#string">admin</xacml:AttributeValue>
       <SubjectAttributeDesignator AttributeId="urn:oasis:names:tc:xacml:1.0:subject:subject-id"
Data Type="http://www.w3.org/2001/XMLSchema#string"
SubjectCategory="urn:oasis:names:tc:xacml:1.0:subject-category:access-subject"/>
      </SubjectMatch>
     </Subject>
    </Subjects>
   </Target>
   <Policy PolicyId="PPS:http://sps2007:ae239ec9-5753-4129-a3d8-ba7fbf7abd91:pps"
RuleCombiningAlgId="urn:oasis:names:tc:xacml:1.0:rule-combining-algorithm:first-applicable"
Version="1.0">
    <Target/>
    <Rule Effect="Permit"
RuleId="null:f5f94957-4447-4f9d-bd83-c5e38c6958b5:ae239ec9-5753-4129-a3d8-ba7fbf7abd91:null:null-1
">
     <Target>
      <Actions>
       <Action>
        <ActionMatch MatchId="urn:oasis:names:tc:xacml:1.0:function:string-equal">
         <xacml:AttributeValue xmlns:xacml="urn:oasis:names:tc:xacml:2.0:policy:schema:os" Data Type="http://www.w3.org/2001/XMLSchema#string">WRITE</xacml:AttributeValue>
         <ActionAttributeDesignator AttributeId="http://tspm.ibm.com/sharepoint/action" Data Type="http://www.w3.org/2001/XMLSchema#string"/>
        </ActionMatch>
       </Action>
      </Actions>
     </Target>
    </Rule>
   </Policy>
  </PolicySet>
</PolicySet>
```

*FIG. 11*

ACL Name: unauth
Description:
Entries:
  User sec_master TcmdbsvaBRl
  Any-other Trx
  Unauthenticated Trx

*FIG. 13*

```
<AuthorizationDecision>
        <Decision>          ←―1402
                ALLOW
        </Decision>
        <CacheDirective>
                <When>
                        <Action>READ</Action>
                </When>
                <CacheDecision>          ←―1404
                        <cache-for-all-users/>
                </CacheDecision>
        </CacheDirective>
<AuthorizationDecision>
```

METHOD AND SYSTEM FOR AUTOMATIC GENERATION OF CACHE DIRECTIVES FOR SECURITY POLICY

BACKGROUND OF THE INVENTION

1. Technical Field

This disclosure relates generally to application security and in particular to a method and system for automatic generation of cache directives for authorization decisions associated with security policy evaluation.

2. Background of the Related Art

Many authorization systems provide a mechanism to integrate with external systems whose results can be combined to calculate an authorization decision. In a known system, a security policy manager includes a mechanism to model application resources and actions, attach policy controlling the conditions under which those resources can be accessed, and evaluate that policy by invoking an authorization API. In such a system, however, calls to external authorization systems cause additional processing overhead, particularly with a decision engine that is remote to the calling application. The performance impact of this remote call can be reduced by the introduction of a cache that determines if, when and how authorization decisions should be cached for re-use.

Within some authorization engines, internal caches may exist and which reduce the amount of time it takes to calculate an authorization decision. A problem, however, still exists when a caller is required to make a remote call to an authorization engine. As noted, the performance cost of making the remote call usually is much larger than any performance gain due to internal caching within the authorization engine itself.

BRIEF SUMMARY

According to this disclosure, an authorization method is implemented in an authorization engine external to an authorization server. The authorization server includes a cache. The external authorization engine comprises an authorization decision engine, and a policy analytics engine. The method begins when the authorization decision engine receives a request for an authorization decision. The request is generated (at the authorization server) following receipt of a client request for which an authorization decision is not then available at the authorization server. The authorization decision engine determines an authorization policy to apply to the client request, applies the policy, and generates an authorization decision. The authorization decision is then provided to the policy analytics engine, which stores previously-generated potential cache directives that may be applied to the authorization decision. Preferably, the cache directives are generated in an off-line manner (e.g., during initialization) by examining each security policy and extracting one or more cache dimensions associated with each such policy. The policy analytics engine determines an applicable cache directive, and the authorization decision is augmented to include that cache directive. The decision (including the cache directive) is then returned to the authorization server, where the decision is applied to process the client request. If caching is possible, the cache directive and authorization decision are then cached for re-use at the authorization server.

In an alternative embodiment, the above-described method is performed in an apparatus.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 9 is a first example policy, which is specified according to XACML;

FIG. 10 is an authorization decision returned by the external authorization sub-system with respect to the first sample policy;

FIG. 11 is a second example policy, also written in XACML;

FIG. 12 is an authorization decision returned by the external authorization sub-system with respect to the second example policy;

FIG. 13 is a third example policy, specified as an ACL using a known model; and FIG. 14 is an authorization decision returned by the external authorization sub-system with respect to the third example policy.

DETAILED DESCRIPTION OF AN ILLUSTRATIVE EMBODIMENT

Figure 1:
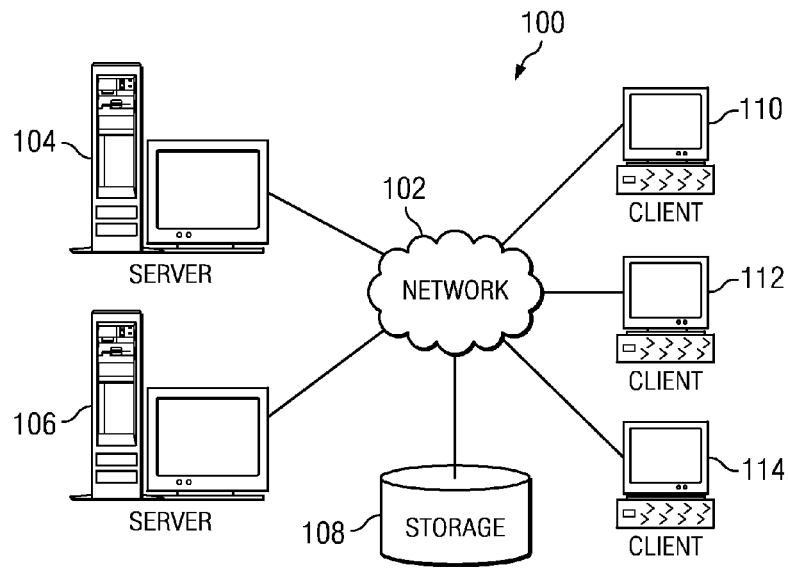
FIG. 1 depicts an exemplary block diagram of a distributed data processing environment in which exemplary aspects of the illustrative embodiments may be implemented.
Figure 2:
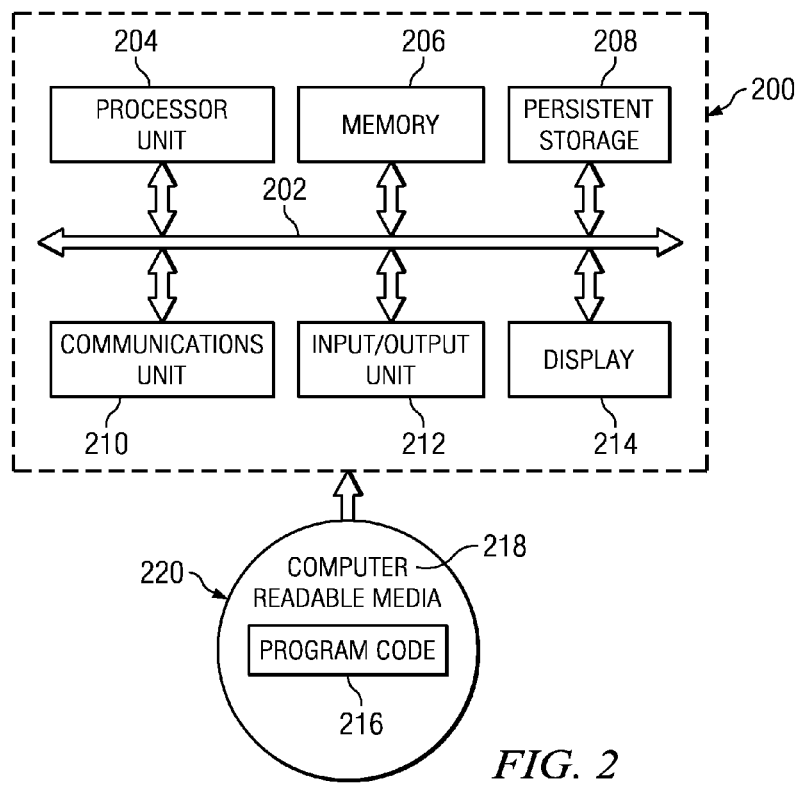
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

A data processing system such as illustrated in FIG. 2 may be configured as a client system, or a server system.

Figure 3:
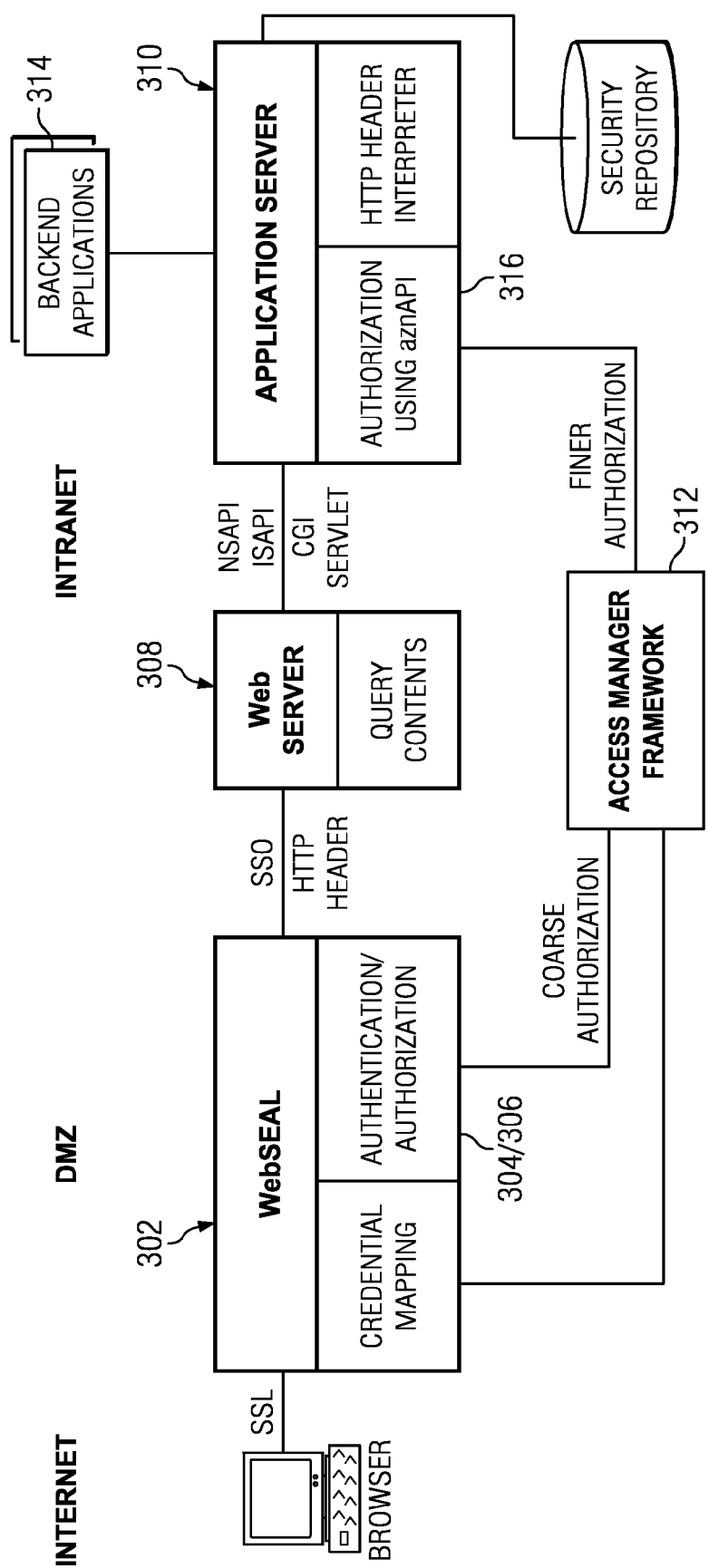
FIG. 3 illustrates a Web portal having an access management framework in which the subject disclosure may be implemented.

A typical enterprise system in which the subject matter of this disclosure may be implemented includes an authorization component. Authorization typically is provided in association with an access manager, which is a component that prevents unauthorized use of resources, including the prevention of use of a given resource in an unauthorized manner. A representative access manager is the Tivoli® Access Manager for e-business (TAM) product, which is available commercially from IBM, and is represented in FIG. 3. Of course, the identification of this commercial product is not meant to be taken to limit the disclosed subject matter. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. As described above, this component is responsible for the authorization of users.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

TAM provides a reverse proxy, web plug-in or the like that provides session management functionality and that includes authorization functionality as part of this session management. Authentication is handled by TAM, meaning that TAM collects a user's authentication credentials, evaluates them, and establishes a session, including some form of session management functionality (such as a session cookie). To provide a user with the advantages of this consolidated environment, TAM then provides a single sign-on solution for the user by asserting authentication credentials (such as username/password) to the back-end applications. This allows the back-end application to be added to the portal environment without modification.

The authentication and authorization framework illustrated in FIG. 3 may be extended with additional security policy components that are available commercially. For example, IBM Tivoli Security Policy Manager (TSPM) provides the capability to externalize an application's authorization decisions, allowing for a policy-based approach to managing entitlements across an enterprise. TSPM provides a mechanism to model application resources and actions, attach policy controlling the conditions under which those resources can be accessed, and evaluate that policy by invoking an authorization API. The authorization API is built on two standards: Java Authorization Contract for Containers (JACC), and eXtensible Access Control Markup Language (XACML). As is well-known, the JACC specification is extended to allow applications to pass so-called "context" information. In a typical TSPM operation, this context information, such as the authenticated user and the resource being accessed, is converted into an XACML request and sent to a Runtime Security Service (RTSS) to be evaluated against a policy. JACC-style context handlers are used to populate additional information that may be needed for the policy to reach a decision. As used herein, "context" refers to context information consistent with the above-identified standards.

Using such solutions, it is also known to provide a "policy generator" to translate access pattern data to technology-specific policies and to provide these policies to the "policy manager," which is responsible for distributing the policies to one or more "policy enforcement points" within or across an enterprise. A policy enforcement point (PEP) may comprise a local or remote (i.e., external) policy decision point (PDP) at which a policy decision is applied.

In a known commercial authentication, authorization and security policy framework, TAM is used as a front-end, and TSPM is used as a back-end. Of course, the techniques that are described below are not limited to any specific implementation.

Automatic Generation of Cache Directives for Security Policy

The subject matter herein typically is implemented in the context of an authorization server that has externalized at least part of an authorization decision to an external authorization engine in the manner illustrated in FIG. 3. As noted above, a commercial system that provides the basic capability to externalize an application's authorization decisions is IBM Tivoli Security Policy Manager, and the following techniques may be implemented on such a platform. In the following discussion, it is further assumed that an authenticated (user) browser session has been established between a client browser and the authorization server with respect to a web application (or other resource) executing on an associated web (or other) server, once again in a well-known manner. The particular manner in which the secure browser session has been established is not within the scope of this disclosure.

Figure 4:
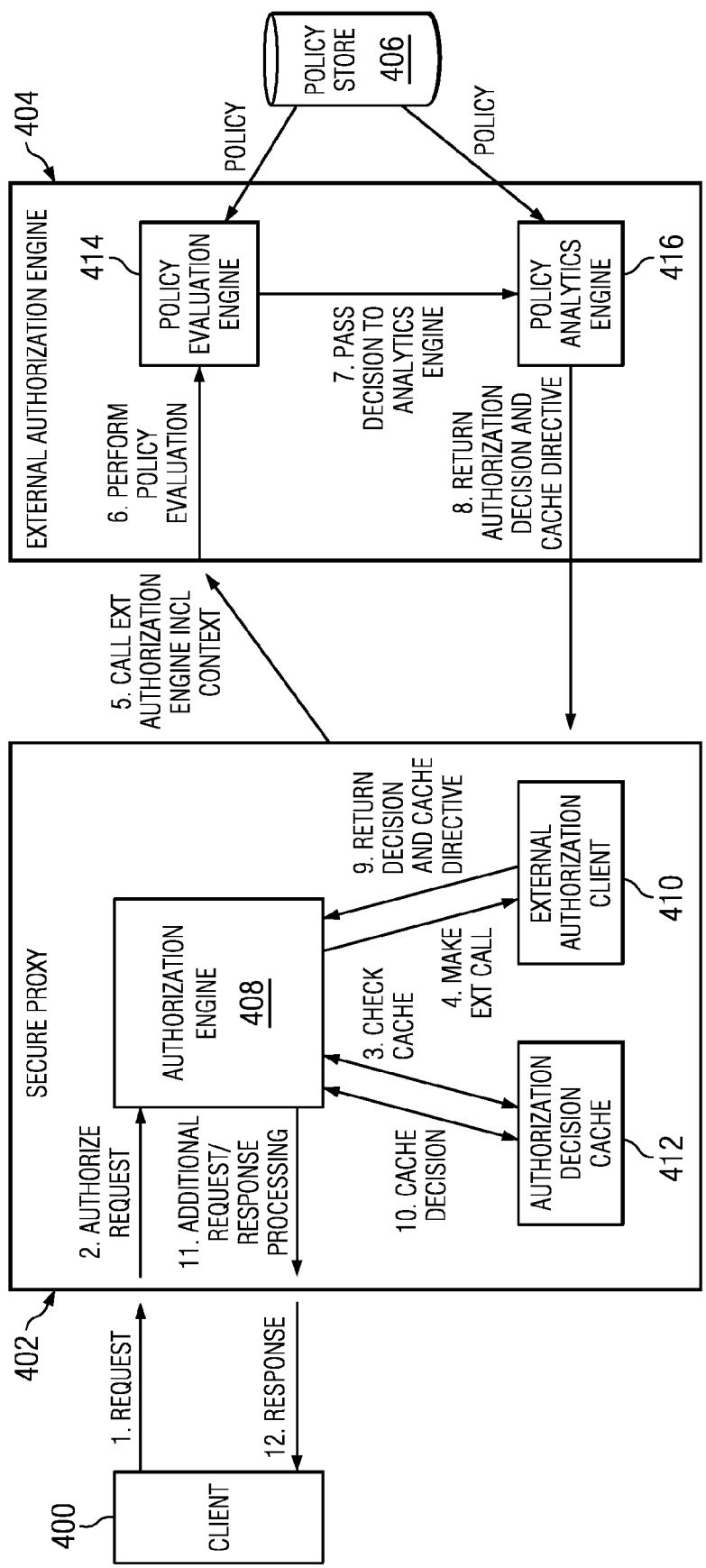
FIG. 4 is a simplified block diagram of an authorization system comprising an external authorization sub-system having an analytics engine according to this disclosure.

FIG. 4 illustrates a representative (i.e. non-limiting) scenario in which the techniques of this disclosure may be practiced. Here, the client system includes an HTTP client 400 (typically a browser) makes a request to a secure proxy (authorization server) 402 that has an external authorization engine 404 associated therewith. In general, the authorization server acts as a security policy enforcement point (PEP) as that term is generally understood in the pertinent art. The external authorization engine 404, which acts as a security policy decision point (PDP), has a policy store 406 associated therewith. The policy store 406 may be local to the external authorization engine 404, or remote. The policy store may be in-memory, a persistent data store, a cloud-based data store, or the like. The authorization server 402 acts as a client to the external authorization engine 404. As also shown in FIG. 4, the authorization server 402 preferably comprises a number of components: an authorization engine 408, an external authorization client 410, and an authorization decision cache 412. As will be described, the authorization decision cache 412 stores for re-use one or more cache directives and results from one or more previous authorization decision requests.

The external authorization engine 404 comprises a number of components: a policy evaluation engine 414, and a policy analytics engine, 416. As will be seen, the policy analytics engine extends the policy evaluation engine to provide the functionality of this disclosure.

The authorization engine 408 and its externalized policy evaluation engine 414 are known in the art. According to this disclosure, the authorization engine is extended to include the authorization decision cache 412, and the policy evaluation engine 414 is augmented with the policy analytics engine 416. In one embodiment, the policy analytics engine 416 is distinct from the policy evaluation engine, but this is not a requirement. In an alternative embodiment, the policy analytics engine 416 is integral to the policy evaluation engine, in which case it is implemented as a functional component thereof. Thus, the representation (in which the components 414 and 416 are shown as distinct and independent) is not meant to be limiting. In addition, each of the policy evaluation engine and the policy analytics engine may be implemented across a single machine or process, or across multiple machines and processes.

FIG. 4 illustrates a representative transaction flow among the components of the security framework or system. These components typically are implemented as software modules, processes, programs, or execution threads, operating in a known manner across a single machine, or across multiple connected machines. This transaction flow is now described. Communications between the secure proxy and its externalized components typically occur over a secure channel, although this is not a requirement. The secure proxy may interface with the external authorization engine over an application programming interface (API).

At step 1, the client makes a request (typically over https) to the secure proxy 402 acting as an authorization server. At step 2, the proxy has determined that it must authorize the request. An authorization request is then provided to the authorization engine 408. At step 3, the authorization engine 408 performs a cache check in the authorization decision cache 412 to determine if a decision already exists for the request. As will be seen, an aspect of this disclosure is that a particular authorization decision (generated by the external authorization engine 404) is cached for re-use in the authorization decision cache (if caching is available). The decision may be cached for a configurable period, depending on the size of the cache and other factors, such as communication latency.

Referring back to the drawing, at step 4, the authorization engine 408 decides, after having checked the cache and found no prior decision (or, in the alternative, a stale decision), that an external authorization call is requested. The authorization engine 408 then instructs its external authorization client 410 to do so. At step 5, the external authorization client 410 makes an authorization call to the external authorization engine 404 and includes a "context" in which the authorization decision is to be made. As used herein, the "context" typically is information about the resource being accessed, the type of access being requested, and an arbitrary set of attributes describing an environment in which the request is being made, such as time of day/week, or location of the server or data. The representation of the context may vary based on the authorization policy standard being used.

The external authorization engine 404 receives the call and, at step 6, the engine 404 uses its policy evaluation engine 414 to perform a policy evaluation. At step 7, the outcome of the policy evaluation is passed from the policy evaluation engine 414 to the policy analytics engine 416. At step 8, and as will be described in more detail below, the policy analytics engine 416 then makes a decision about the cache directive that should be returned (if any) for this context and the applicable policy; it then returns this information to the external authorization client 410 of the secure proxy 402. At step 9, the external authorization client 410 returns the cache directive and decision to the authorization engine 408. The authorization engine then inspects the cache directive and, at step 10, caches the decision in the authorization decision cache 412. An additional processing required for the initial request is then performed at step 11 by the authorization engine 408. At step 12, the response is returned to the requesting client. This completes the processing.

Thus, according to the transaction flow shown in FIG. 4, the known technique (of having the authorization engine 408 use an externalized policy evaluation engine 414) is augmented (or supplemented) to include the operation of the policy analytics engine 416. In particular, the policy analytics engine 416 determines which cache directive, if any, should be returned with respect to an authorization decision that has been made with respect to a policy and the context at issue (its policy evaluation). As used here, a "cache directive" should be broadly construed to refer to any directive that may be implemented with respect to an authorization decision, and representative cache directives may be quite varied, e.g., "cache for all users," "cache for this user only," "cache for this action only," "cache for all actions," "do not cache," and so forth. The particular semantics and nomenclature for the cache directives are not limited to any particular approach.

Figure 5:
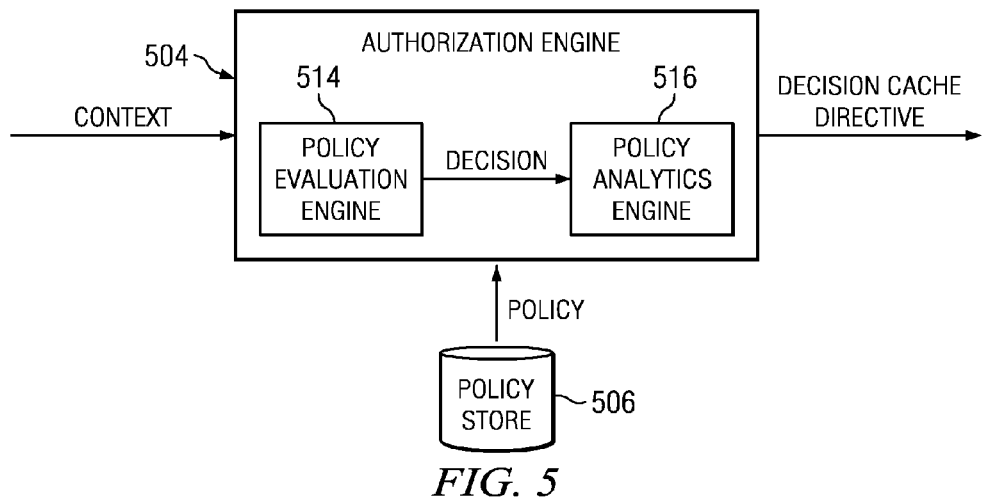
FIG. 5 illustrates a block diagram of the external authorization sub-system of FIG. 4.

FIG. 5 illustrates the operation of the external authorization engine in more detail. As noted above, the external authorization engine 504 receives a call (e.g., an API call, an HTTP-based request, a SOAP call, or the like) from the authorization server that includes a context. As noted above, the "context" refers to the context information, such as the authenticated user and the resource being accessed. The policy evaluation engine 514 uses this context to determine the applicable policy to retrieve from the policy store 506. Based on the context and the policy, the policy evaluation engine makes a decision; this is a known operation. According to this disclosure, that decision is then supplied to the policy analytics engine 516 to identify an appropriate cache directive that is to accompany the decision that has been made by the policy evaluation engine. Once the cache directive has been determined, the policy analytics engine 516 then provides the decision and the determined cache directive back to the authorization server, in the manner described.

In particular, the policy analytics engine 516 works in conjunction with the policy decision (the policy evaluation engine 514) to return both a policy decision and a policy cache directive for a caller to consume. In general, the policy analytics engine 516 works by examining specific policy and determining how the current decision, or similar decisions, may be cached by the caller. Thus, according to this disclosure, when an authorization decision is made, instead of returning the result back to the caller directly, the external authorization engine preferably goes through an additional analysis phase where the analytical engine (the policy analytics engine 516) inspects specific policy and adds a cache directive to the result. As used herein, a "result" or "response" returned from the external authorization engine may be the decision and the cache directive, or the combination thereof. In a preferred embodiment, the authorization decision is constructed in XML and includes the cache directive embedded therein. Several examples of this XML-based approach are shown in FIGS. 10, 12 and 14 below. The authorization decision and the cache directive can be returned from the external authorization engine in any convenient manner of course. As will be described, the policy analytics engine 516 is closely tied to the policy evaluation engine 514 in that it understands the policy language that the policy decision uses, regardless of whether the caller knows about this language. The cache directive and decision thus are policy language-agnostic, but the external authorization engine nevertheless still returns a decision and a cache directive that a caller can consume.

Figure 6:
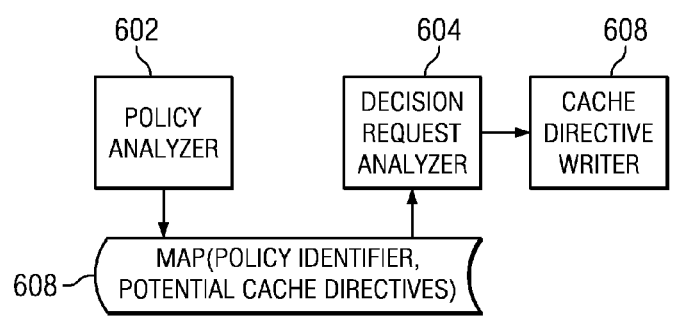
FIG. 6 illustrates a block diagram of the components of an analytics engine of FIG. 5 according to an embodiment of the disclosed subject matter.

In an illustrative embodiment, which is now described, these advantages are achieved as follows. With reference to FIG. 6, the policy analytics engine preferably implements several functions using components/modules that are identified for convenience as follows: a policy analyzer 602, a decision request analyzer 604, and a cache directive writer 606. These components may be a single component. The policy analyzer 602 typically is implemented during an initialization or configuration phase, or periodically. It comprises a series of steps or operations that are described in more detail in the process flow diagram in FIG. 7. As will be seen, as a result of executing the policy analyzer 602, a map (or, more generally, a data array or data structure) 608 is generated. The map 608, which may be implemented as a hash map, associates each policy (as identified by a policy identifier) with a set of potential cache directives that may be used in association with that policy. Preferably, and as noted above, the map is generated off-line (during initialization or configuration), and it is available to the decision request analyzer 604, which is the routine that makes a decision (using the map) about which cache directive (if any) should augment (e.g., be included with or within) a particular authorization decision. The decision request analyzer comprises a series of steps or operations that are described in more detail in the process flow diagram of FIG. 8. In a representative embodiment, each of the routines in FIG. 7 and in FIG. 8 may be implemented in software as a set of computer program instructions executed in one or more processors.

Figure 7:
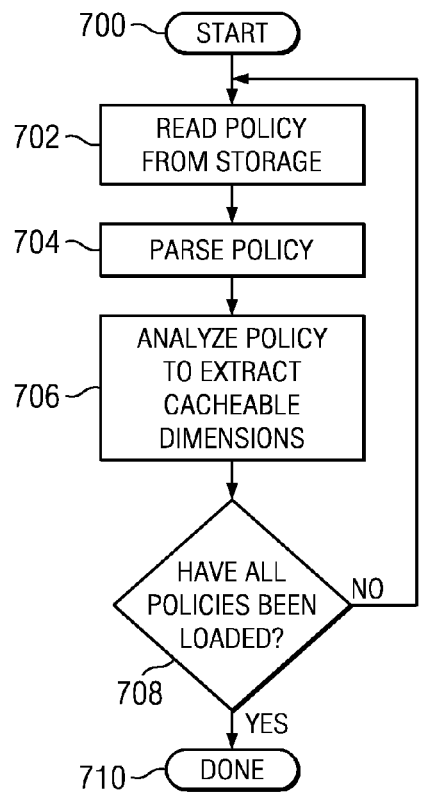
FIG. 7 is a process flow diagram illustrating an operation of a policy analyzer routine of the analytics engine in FIG. 6

Referring now to FIG. 7, a prepare policy routine, which is the function of the policy analyzer 602, is described. As noted above, this routine typically is executed off-line, such as during initialization of the external authorization engine (and/or the policy analytics engine thereof). In general, this routine identifies the potential for cacheability of a policy decision. By way of brief background, according to the techniques herein, for a given authorization policy type and its syntax, a set of potential cacheable dimensions exist and/or may be determined. For example, dimensions of an XACML policy that may be cacheable include "subject" and "actions." When analyzing a policy, policy dimensions may be examined and potential cache directives determined. Thus, for example, if a match criterion for a "subject" (in an XACML policy) is one or more groups, then a potential cache directive is around that group(s). As an alternative example, if a match criterion for the "subject" is a wildcard representing all users, then a potential cache directive is some designation of "all users" or "all authenticated." The set of "actions" in a policy may also be a cacheable dimension. Other dynamic features of a policy may override cacheability. For example, a policy that references a rule (e.g., an externally-coded one) might be deemed to negate any potential for caching. A more sophisticated implementation may enable an administrator to specify caching semantics of an external rule upon configuration.

Referring now to FIG. 7, the routine begins at step 700. At step 702, a policy is read from the policy store. The routine continues at step 704 to parse the policy. At step 706, the policy is analyzed to extract one or more cacheable dimensions and, based on those dimensions, to identify a set of one or more potential cache directives that may be used in association with that policy.

How a particular policy is parsed to identify its cacheable dimension(s) thus is a function of the policy language, including the policy specification and semantics. For example, for the sample XACML policy in FIG. 9, the policy is applicable for all Subjects if the action is 'READ,' and thus the cache directive is 'all users and action equals READ' as shown in FIG. 10. The discussion above provides several other examples of this process step, which may be implemented programmatically, manually, or otherwise.

At step 708, a test is performed to determine if all the policies from the policy store have been loaded and analyzed. If the outcome of the test at step 708 is negative, the routine cycles back to step 702 to read a next policy from the policy store. If, however, the outcome of the text at 708 indicates that all of the policies have been analyzed, the routine terminates at step 710. The result is the map, which stores an association of a policy (identified by a policy identifier) and its one or more potential cache directives.

Thus, the techniques herein take advantage of the characteristic that a policy has one or more potential cache directives associated therewith. These potential cache directives are stored in a manner such that they may be readily and efficiently accessed, searched and retrieved by the policy evaluation engine. As noted above, a hash map is one representative embodiment of the map.

Figure 8:
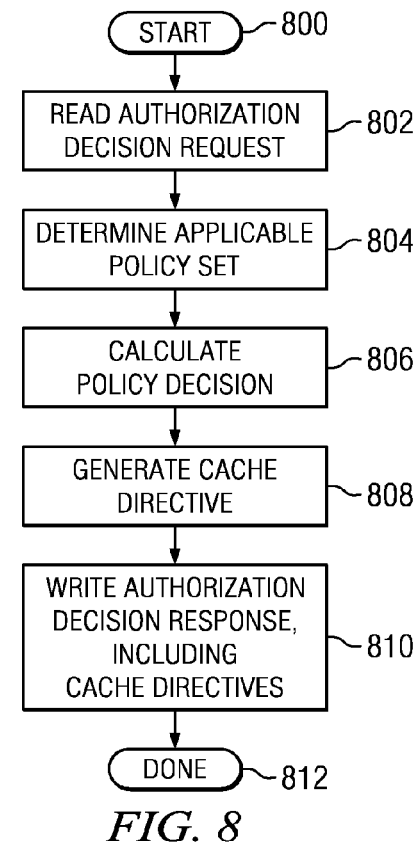
FIG. 8 is a process flow diagram illustrating an operation of a decision request analyzer routine of the analytics engine in FIG. 6.

FIG. 8 illustrates an evaluate decision request routine. This routine is performed by the decision request analyzer 604 of FIG. 6. The routine begins at step 800. At step 802, the routine reads the authorization decision request that has been received by the policy evaluation engine. The routine then continues at step 804 to determine an applicable policy set. At step 806, the routine calculates the policy decision. As previously noted, these operations are the usual functions of the external authorization engine. According to this disclosure, as also noted, the policy decision is augmented to include or reference a cache directive. To that end, the routine then continues at step 808 to identify the cache directive. Preferably, the cache directive is identified by retrieving the cache directives for the policies determined applicable during step 804. If more than one policy is identified in step 804, then the cache directives may be combined, e.g., using the same logical Boolean operator (e.g., AND or OR) as used to combine the policies in calculating the authorization decision. At step 810, the routine writes the authorization decision response (by passing control to the cache directive writer of FIG. 6). As noted above, preferably the authorization decision includes the identified cache directive. Once the appropriate cache directive is identified from the map and written into the authorization decision, the routine then terminates. This is step 812.

FIG. 9 is an example of a first XACML policy, which allows all users to perform a READ action with respect to a resource to which the policy is attached. In this example, by carrying out the steps in FIG. 8, the policy analytics engine determines that the result is independent of the subject, that the action set is constrained to a READ action, and that there are no dynamic rules present in the policy. As a result, the policy analytics engine (and, in particular, the cache directive writer) generates an authorization decision such as shown in FIG. 10. As illustrated, the authorization decision 1000 is written in XML and comprises a decision section 1002, and the cache directive 1004. As can be seen, the cache directive 1004, which is representative, defines "when" to cache the decision, and the particular "cache decision" itself (e.g., "cache-for-all-users").

FIG. 11 is an example of a second XACML policy, which allows a user administrator (admin) to perform a WRITE action with respect to a resource to which the policy is attached. A representative authorization decision is shown in FIG. 12. In this example, this decision 1200 comprises decision section 1202, and a cache directive 1204. As can be seen, this authorization decision is "allow and cache this decision for this user only."

The technique is not limited for use with XACML-based policies such as shown in FIG. 10 and FIG. 12. The policy may be of any type, such as an access control list (ACL)-based policy. FIG. 13 is an example of a third ACL policy, which allows unauthenticated read access with respect to a resource to which the ACL is attached. A request for a resource by any user performing the READ action would then return an authorization decision such as "allow and cache this decision for all users," as represented by the XML-based authorization decision 1400 comprising decision section 1402 and cache directive 1404 shown in FIG. 14.

As a skilled person will recognize, the authorization decision and cache directive returned from the external authorization engine is the same in both the first and third examples, despite that the policy language used to write the respective policy was different.

The disclosed subject matter provides significant advantages. The policy analytics engine augments the policy decision with a cache directive that may be re-used as needed by the proxy. In this manner, an authorization decision may be cached and re-used, thereby obviating one or more external calls to the external authorization engine. The policy analytics engine and the policy decision engine understand the policy language that the policy decision uses, irrespective of whether the caller knows about this language. As noted above, the cache directive and decision thus are policy language-agnostic, but the external authorization engine nevertheless still returns a decision and a cache directive that a caller can consume.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The secure web server itself may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the analytics engine is implemented in a special purpose computer, preferably in software executed by one or more processors. The software is maintained in one or more data stores or memories associated with the one or more processors, and the software may be implemented as one or more computer programs. Collectively, this special-purpose hardware and software comprises the analytics engine framework, and the associated response processing, which are described above.

The policy analyzer, decision request analyzer, and cache directive writer functionality provided by the analytics engine may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, Chrome or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to a Web-based portal having a point of contact that provides authentication, session management and authorization, but this will be a typical implementation. As noted, the above-described function may be used in any system, device, portal, site, or the like wherein server-set session management data might be re-used (either by an original user in a different session, or by another user) through the same client browser. More generally, the described technique is designed for use in any operating environment wherein given information (including, without limitation, session management data) is not intended to persist across applications or sessions but ends up doing so because of patterns of client re-use and/or application-level granularity of session information.

Having described our invention, what we now claim is as follows.

The invention claimed is:

1. A method for automatically generating cache directives for an authorization policy, comprising:
   receiving a request for an authorization decision, the request having been generated as a result of receipt, at a proxy, of a client request;
   determining an authorization policy to apply to the client request;
   based on the determination of the authorization policy and other information, determining a decision and a cache directive to apply to the request for authorization decision, the cache directive being selected from a set of cache directives, the set of cache directives having been generated in advance of receiving the request by analyzing the authorization policy to determine a potential for cacheability of a particular authorization decision; and
   returning to the proxy, in response to the request for the authorization decision, the decision and the cache directive, the decision for use at the proxy to respond to the client request, the cache directive for use at the proxy for re-use with respect to a subsequent request for the authorization decision.

2. The method as described in claim 1 wherein the other information is a context.

3. The method as described in claim 1
   wherein the cache directive directs that the authorization decision is to be cached for one of: a particular user associated with the request, and a set of users that include the particular user.

4. The method as described in claim 1 wherein analyzing the authorization policy includes parsing a type and syntax associated with the policy and identifying one or more cache dimensions associated therewith.

5. The method as described in claim 4 further including associating a cache directive with a given one of the one or more cache dimensions.

6. The method as described in claim 1 wherein the set of cache directives are stored in a hash map.

7. The method as described in claim 1 wherein the decision is formatted as XML and includes the cache directive.

8. Apparatus, comprising:
   a processor;
   computer memory holding computer program instructions that when executed by the processor perform a method for automatically generating cache directives for an authorization policy, the method comprising:
      receiving a request for an authorization decision, the request having been generated as a result of receipt, at a proxy, of a client request;
      determining an authorization policy to apply to the client request;
      based on the determination of the authorization policy and other information, determining a decision and a cache directive to apply to the request for authorization decision, the cache directive being selected from a set of cache directives, the set of cache directives having been generated in advance of receiving the request by analyzing the authorization policy to determine a potential for cacheability of a particular authorization decision; and
      returning to the proxy, in response to the request for the authorization decision, the decision and the cache directive, the decision for use at the proxy to respond to the client request, the cache directive for use at the proxy for re-use with respect to a subsequent request for the authorization decision.

9. The apparatus described in claim 8 wherein the other information is a context.

10. The apparatus as described in claim 8
    wherein the cache directive directs that the authorization decision is to be cached for one of: a particular user associated with the request, and a set of users that include the particular user.

11. The apparatus as described in claim 8 wherein analyzing the authorization policy includes parsing a type and syntax associated with the policy and identifying one or more cache dimensions associated therewith.

12. The apparatus as described in claim 11 wherein the method further includes associating a cache directive with a given one of the one or more cache dimensions.

13. The apparatus as described in claim 8 wherein the set of cache directives are stored in a hash map.

14. The apparatus as described in claim 8 wherein the decision is formatted as XML and includes the cache directive.

15. A computer program product in a non-transitory computer readable medium for use in a data processing system, the computer program product holding computer program instructions which, when executed by the data processing system, perform a method for automatically generating cache directives for an authorization policy, the method comprising:
    receiving a request for an authorization decision, the request having been generated as a result of receipt, at a proxy, of a client request;
    determining an authorization policy to apply to the client request;
    based on the determination of the authorization policy and other information, determining a decision and a cache directive to apply to the request for authorization decision, the cache directive being selected from a set of cache directives, the set of cache directives having been generated in advance of receiving the request by analyzing the authorization policy to determine a potential for cacheability of a particular authorization decision; and
    returning to the proxy, in response to the request for the authorization decision, the decision and the cache directive, the decision for use at the proxy to respond to the client request, the cache directive for use at the proxy for re-use with respect to a subsequent request for the authorization decision.

16. The computer program product as described in claim 15 wherein the other information is a context.

17. The computer program product as described in claim 15
    wherein the cache directive directs that the authorization decision is to be cached for one of: a particular user associated with the request, and a set of users that include the particular user.

18. The computer program product as described in claim 15 wherein analyzing the authorization policy includes parsing a type and syntax associated with the policy and identifying one or more cache dimensions associated therewith.

19. The computer program product as described in claim 18 wherein the method further includes associating a cache directive with a given one of the one or more cache dimensions.

20. The computer program product as described in claim 15 wherein the set of cache directives are stored in a hash map.

21. The computer program product as described in claim 15 wherein the decision is formatted as XML and includes the cache directive.

22. An authorization system, comprising:
a proxy comprising a cache;
an authorization policy engine distinct from the proxy; and
computer memory holding computer program instructions executed by a processor to perform a method for authorization, the method comprising:
at the proxy:
  receiving a client request;
  checking the cache to determine whether a decision with respect to the client request is available;
  sending a request for authorization to the authorization policy engine if there is no decision with respect to the client request available in the cache;
at the authorization policy engine:
  determining an authorization policy to apply to the client request;
  based on the authorization policy, determining an authorization decision to apply to the client request;
  determining a cache directive associated with the authorization decision, the cache directive being selected from a set of cache directives, the set of cache directives having been generated in advance of receiving the request by analyzing the authorization policy to determine a potential for cacheability of a particular authorization decision;
  returning to the proxy the authorization decision and the cache directive;
at the proxy:
  caching the cache directive in the cache; and
  processing the client request based on the authorization decision.

* * * * *